(12) United States Patent
Zysman et al.

(10) Patent No.: US 9,304,781 B2
(45) Date of Patent: Apr. 5, 2016

(54) SYSTEM AND METHOD FOR RUNNING APPLICATIONS FROM COMPUTER DEVICES

(71) Applicant: DOMINOPOS PTE LTD, Singapore (SG)

(72) Inventors: Bruno Zysman, Paris (FR); Jeff Duboc, Ho Chi Minh (VN)

(73) Assignee: DOMINOPOS PTE LTD, Singapore (SG)

( * ) Notice: Subject to any disclaimer, the term of this patent is extended or adjusted under 35 U.S.C. 154(b) by 189 days.

(21) Appl. No.: 14/347,712

(22) PCT Filed: Sep. 24, 2012

(86) PCT No.: PCT/SG2012/000352
§ 371 (c)(1),
(2) Date: Mar. 27, 2014

(87) PCT Pub. No.: WO2013/048340
PCT Pub. Date: Apr. 4, 2013

(65) Prior Publication Data
US 2014/0237488 A1     Aug. 21, 2014

(30) Foreign Application Priority Data
Sep. 27, 2011   (SG) .............................. 201106990-3

(51) Int. Cl.
| G06F 13/00 | (2006.01) |
| G06F 9/44 | (2006.01) |
| G06F 9/54 | (2006.01) |
| H04W 4/08 | (2009.01) |
| H04W 4/00 | (2009.01) |

(52) U.S. Cl.
CPC .............. *G06F 9/4411* (2013.01); *G06F 9/541* (2013.01); *H04W 4/001* (2013.01); *H04W 4/008* (2013.01); *H04W 4/08* (2013.01); *G06F 2209/547* (2013.01); *H04W 4/00* (2013.01)

(58) Field of Classification Search
CPC ...................................................... G06F 9/4411
USPC ........................................................... 719/321
See application file for complete search history.

(56) References Cited

U.S. PATENT DOCUMENTS

| | | | |
|---|---|---|---|
| 7,299,490 B2 * | 11/2007 | Berkema ................ | G06F 3/1205 709/218 |
| 8,937,930 B2 * | 1/2015 | Sprigg .................. | G06F 9/4411 370/338 |
| 2003/0038963 A1 * | 2/2003 | Yamaguchi ............ | G06Q 20/10 358/1.15 |
| 2004/0133525 A1 | 7/2004 | Singh et al. | |
| 2005/0044479 A1 * | 2/2005 | Willams ................ | G06F 3/1222 715/273 |
| 2006/0271695 A1 | 11/2006 | Lavian | |
| 2011/0055892 A1 * | 3/2011 | Wang ...................... | G06F 21/82 726/3 |
| 2012/0182939 A1 * | 7/2012 | Rajan ................... | A61B 5/0008 370/328 |

* cited by examiner

*Primary Examiner* — Andy Ho
(74) *Attorney, Agent, or Firm* — Rothwell, Figg, Ernst & Manbeck, P.C.

(57) ABSTRACT

A system and method is described to allow web applications to be run from Wi-Fi capable computer devices independent of the operating system of the computer devices. The web applications are stored in a web server which also acts as a wireless access point. Peripherals, which are locally accessible by users and are associated with certain functions of the web applications, are operatively connected to the web server. The web pages of the web application are sent via the Wi-Fi network to the computer devices allowing the user of the computer devices to use the web application as well as their associated peripherals.

12 Claims, 3 Drawing Sheets

SYSTEM AND METHOD FOR RUNNING APPLICATIONS FROM COMPUTER DEVICES

CROSS REFERENCE TO RELATED APPLICATION(S)

This application is a 35 U.S.C. §371 National Phase Entry Application from PCT/SG2012/000352, filed Sep. 24, 2012, designating the United States and also claims priority to Singapore Application No. 201106990-3, filed Sep. 27, 2011. The disclosures for each of the referenced applications are incorporated herein in their entirety by reference.

FIELD OF THE INVENTION

The present invention relates to a system and method that allows web applications to be run from computer devices independent of the operating system of the computer devices.

BACKGROUND

With the advances in technology, the use of computer devices (mobile phone, tablets, desktops and laptops etc) has become more prevalent and has now permeated into other aspects of our everyday life. Today, a computer device can not only be used for communication (internet, telephone, chatting), entertainment (games, music, videos, photos), work (document processing), but it can also be used for other applications like monitoring and controlling industrial installations, transactional payments, remote medical diagnosis, energy monitoring, customer relationship management, marketing, and the list goes on. However, the ease of deployment of these "other" applications is hampered by the limited interoperability of computer devices.

Computer devices cover a large spectrum, have different operating systems (Windows Mobile, IOS, Android, RIM etc) and do not have all standard extension port implementation like USB to add peripherals. And even in the case where a computer device does have an extension port, its implementation may not be standard. For example, the Apple iPhone does not support USB On-The-Go. The peripherals will also require specific software (drivers) for the operating system to communicate with it.

It is possible to install the operating system-compatible application on the computer device itself and connect the peripheral directly to the computer device. However, this paradigm suffers from poor scalability as each time a computer device wants to initiate use of an application; the operating system specific application has to be installed on the computer device. Moreover, the number of applications that can run at any one time on a computer device will be limited by the number of ports on the computer device that are available to connect to the associated peripherals.

Therefore, the object of the invention is to provide a solution that overcomes the above disadvantages or at least provides a novel system and method that allows web applications to be run from computer devices.

SUMMARY OF INVENTION

According to an embodiment, a computing device is described to allow for a web application to be run from any Wi-Fi capable computer device having a browser, independent of its operating system. The computing device has a web server having a web application and a wireless access point for wireless communication with the computer device. The computing device also has a port which a peripheral device is connected to. The peripheral device is thus locally accessible to a user. The peripheral device is associated with a function of the web application. The computing device also has a processor having an operating system and a device driver for allowing the web application to communicate with the peripheral device. In operation, a web page of the web application is loaded wirelessly onto the browser of the computer device and thereafter, a user can use the computer device to select on the web page the function of the web application which then sends instructions to the peripheral device.

In another embodiment, the web page of the web application has computer device specific cascading style sheets. In another embodiment, the computing machine has a housing. In another embodiment, the peripheral device is integrated mechanically within the housing or is an independent device external to the housing.

In another embodiment, the operating system is Linux. In another embodiment, the computing machine has internet connecting capabilities.

In another embodiment, a method is described to allow for a web application to be run from any Wi-Fi capable computer device having a browser, independent of its operating system. The method involves establishing wireless connection between the computer device and a wireless access point. The wireless access point is operatively connected to a web server and a peripheral device which is locally accessible to a user, and the web server has a web application. A web page of the web application is then loaded onto the browser of the computer device via the wireless connection. A user then uses the computer device to select on the web page a function of the web application, the peripheral device being associated with the function of the web application. A processor having an operating system and a device driver then interfaces the web application and the peripheral device allowing the web application to send instructions to the peripheral device.

In another embodiment, the step of loading a web page of the web application onto the browser of the computer device via the wireless connection further comprises loading the computer device specific cascading style sheets of the web page onto the browser of the computer device.

In another embodiment, a further step of providing an Application Programming Interface and a toolkit is provided to help customers develop their own web applications and integrate their own new peripheral devices.

In another embodiment, the computer device browser is a webkit browser.

In another embodiment, a method is described for deploying web applications for use with computer devices in a location by installing a computing machine in the location.

The invention will now be described in detail with reference to the accompanying drawings.

BRIEF DESCRIPTION OF THE DRAWINGS

In order that embodiments of the invention may be fully and more clearly understood by way of non-limitative examples, the following description is taken in conjunction with the accompanying drawings in which like reference numerals designate similar or corresponding elements, regions and portions, and in which.

DETAILED DESCRIPTION

Figure 1:
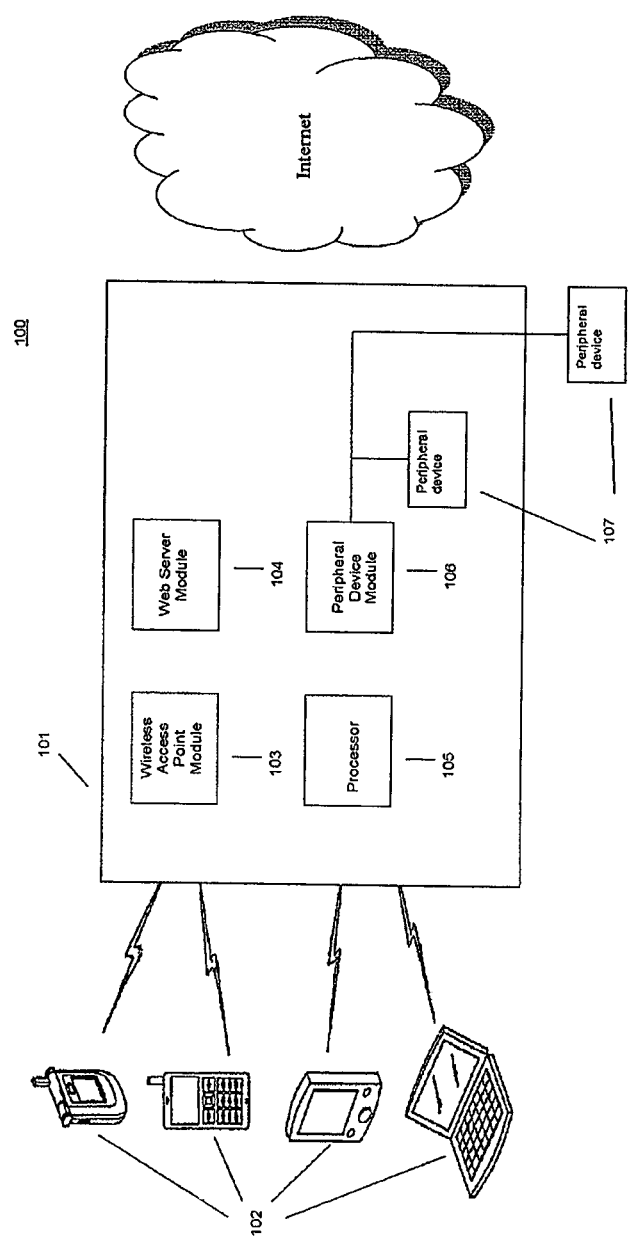
FIG. 1 is a diagram illustrating a system in accordance with a preferred embodiment of the invention.

Referring to the drawings, FIG. 1 shows an exemplary system 100, having a computer base 101 and computer devices 102. Computer devices 102 have a browser (for example Internet Explorer, Safari, Mozilla Firefox, Google Chrome) and the capability to connect to a Wi-Fi network. The browser can be a webkit browser. Examples of computer devices 102 can non-exhaustively include mobile phones, smart phones, tablets, laptops, desktops and notebooks.

The computer base 101 has a wireless access point module 103, a web server module 104 and a processor 105. The computer base 101 also has a peripheral device module 106. The wireless access point module 103 acts as an access point that also supports all security mechanisms of a Wi-Fi network. Web server module 104 contains web applications and a cascading style sheet layer that makes the web applications look like it is a native application of the computer devices 102.

The processor 105 has an operating system, and device drivers for communication with peripheral devices 107. Examples of peripheral devices 107 can non-exhaustively include; external memory/auxiliary storage devices peripheral displays, scanners printers, keyboards, Bluetooth devices, Near Field Communications readers, Zigbee devices, sensors, pin pads. The operating system is preferably Linux, due to its ease in adding peripheral devices.

The peripheral device module 106 can have a device hub, such as a USB hub with many ports for connection to the peripheral devices 107. The computer base 101 can have an external housing to encapsulate the processor 105 and the hardware components of the wireless access point module 103, web server module 104 and the peripheral device module 106. The peripheral devices 107 can be integrated mechanically within the housing, or can be separate independent devices external to the housing.

The computer base 101 also has connection to the Internet via means which can be cellular, Ethernet, DSL, WiMAX, Wi-Fi or any other internet connecting means known in the art.

In operation, a user uses the computer device 102 to select the Wi-Fi network created by the wireless access point module 103. A password may need to be entered. A user then enters the IP address of the web server module 104 on the address bar of the computer device 102 browser. Another password may be required to be entered to allow access to the web server module 104. The entry of this password may be a "one-time" thing, and subsequent connections to the web server module 104 will not require a password to be entered. The password entered may also determine if that computer device 102 has administrative or user privileges.

The information on the type of computer device 102 is sent to the web server module 104. The web server 103 in the computer base 101 has an initial web page. The cascading style sheets layer provides for a plurality of computer device 102 specific cascading style sheets to cater for different types of computer devices 102. The initial web page and the corresponding computer device 102 specific cascading style sheets will then be sent to the computer device 102. In some instances, depending on the rendering of the web page on the browser of the computer device 102, the browser may appear "hidden" to the user. For example, the address bar, search bar, back and forward buttons may disappear such that it may appear to the user that the browser is no longer being used to display the web page.

The computer device 102 browser will then display the initial web page with formatting modifications by the computer device specific cascading style sheets to give the user the same "look" and "feel" that he is accustomed to when normally running applications on his computer device. On the initial web page, a user will be able to select from a plurality of web applications. Each web application has an entry web page. The cascading style sheets layer provides for a plurality of computer device 102 specific cascading style sheets to cater for different computer devices 102.

The web applications that a user can view and access is dependent on whether the computer device 102 has administrative or user privileges. When a user selects a particular web application, the entry web page of that web application and the corresponding computer device 102 specific cascading style sheets will be sent to and displayed on the computer device 102 browser. On the entry web page, a user can select from a plurality of tasks/actions. Each task/action can have a series of web pages. Each web page in the series has a plurality of computer device 102 specific cascading style sheets to cater for different computer devices 102. The selected particular task/action can be associated with a peripheral device 107, which is connected to the peripheral device module 106.

For illustration purposes, the selected particular task/action can be printing a document, and the associated peripheral device 107 can be a printer. When a user selects the printing task, the first web page of the corresponding series with the corresponding computer device 102 specific cascading style sheets will be sent to and displayed on the computer device 102 browser. The web application will then send instructions to the printer to execute the printing task.

In an embodiment, a plurality of peripheral devices 107 can interact with one another. For example, a barcode scanner can send information to a cash register device. In another embodiment, a peripheral device 107 can be used to extend the connectivity network of the system to peripheral devices 107. For example, a ZigBee device being connected to the peripheral device module 106, can create a wireless network for communication to wireless temperature sensor devices.

A variety of different web applications can be used in this invention; applications that span the different sectors like healthcare, Banking and Financial services, Retail, Insurance, Industrial etc. From this disclosure, one skilled in the art can appreciate that users using iPads, Android tablets, Blackberries etc can access the same applications and their peripherals regardless of the operating system (iOS, Android, Blackberry OS), and without installing any client software or drivers. The disclosure also teaches the use of cascading style sheets to make the application look like the computer device is running a native application giving users the "look" and "feel" that they are accustomed to with their computer devices.

An Application Programming Interface (API) and a suite of tools will also be provided for value-added resellers or customers as means to integrate their own new peripheral devices 107 which will help them to develop their own web applications and services. The computer base 101 with its peripheral device module 106 also acts as a "local" connection point for customers to locally access (i.e. within the customers' premises) and easily physically connect new peripheral devices 107.

From this disclosure, one skilled in the art can also see how easy it is to deploy the computer base 101 to any premises to achieve the advantage of the invention. Addition of web applications and its associated peripherals are easy due to the API provided, and the fact that the invention provides for a "local"

connection point. Also, current computer devices can be used without modification; all that the computer devices require is a browser and the capability to connect to a Wi-Fi network.

In another embodiment, the computer base 101 can have a plurality of processors 105. The additional processors may be dedicated to perform cryptographic functions. In another embodiment, the computer base 101 can be a Printed Circuit Board. In another embodiment, the computer base 101 can be module that can be integrated with existing hardware at the deployment site. In another embodiment, the computer base 101 can be powered by fixed power or by battery.

Figure 2:
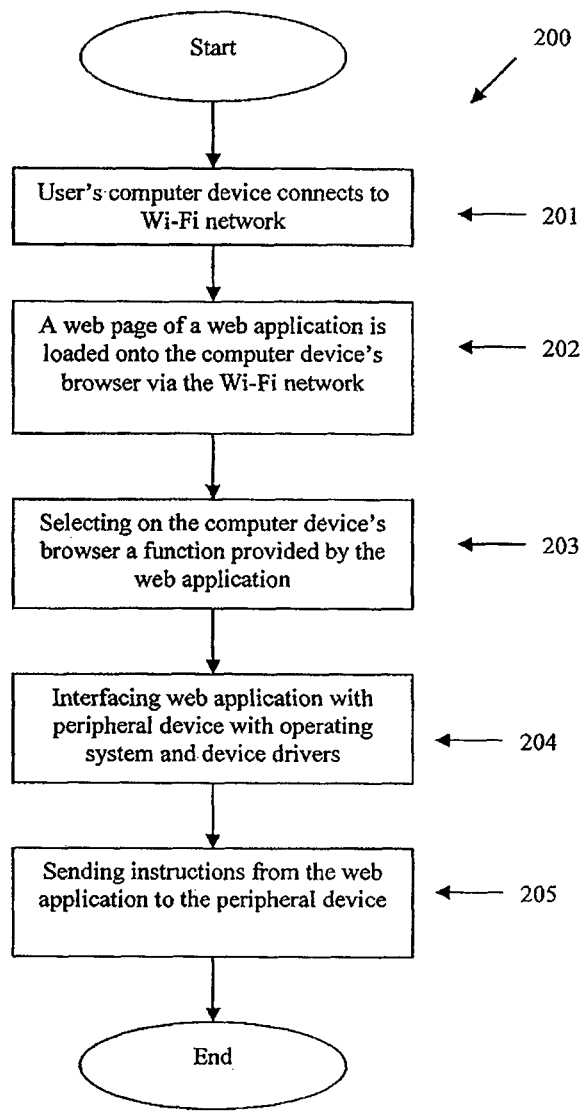
FIG. 2 is a flow chart illustrating a method in accordance with a preferred embodiment of the invention.

Referring to the drawings, FIG. 2 shows an exemplary method 200 in accordance with a preferred embodiment of the invention. A user first connects to a Wi-Fi network with his computer device in step 201. At the centre of the Wi-Fi network is a wireless access point which is operatively connected to a web server, the web server having web applications. The web server is also connected to peripherals which are locally accessible to users and are associated with certain functions of the web applications.

In step 202, a web page of the web application is loaded onto the computer device browser via the Wi-Fi network. In step 203, on the web page, the user selects a function provided by the web application. In step 204, the operating system and device drivers work together to provide a communication interface between the web application and the peripheral device such that the web application can communicate with the peripheral device. In step 205, the web application sends instructions to the peripheral device.

Figure 3:
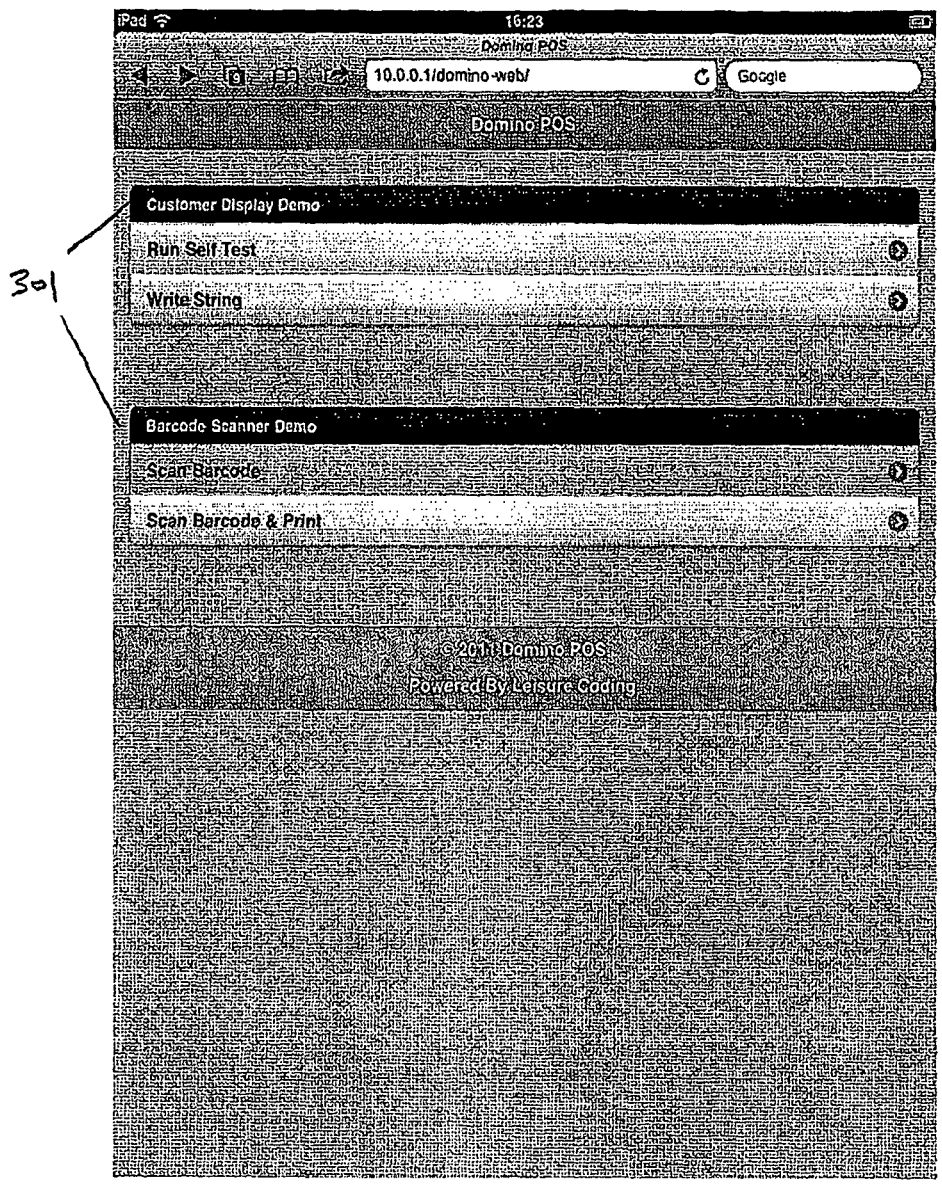
FIG. 3 is a screenshot of an initial web page being displayed on an iPad.

FIG. 3 shows a screenshot of an initial web page being displayed on an iPad. The initial web page displays web applications 301.

While exemplary embodiments pertaining to the invention have been described and illustrated, it will be understood by those skilled in the technology concerned that many variations or modifications involving particular design, implementation or construction are possible and may be made without deviating from the inventive concepts described herein.

The invention claimed is:

1. A computing machine for allowing web applications to be run from a Wi-Fi capable computer device independent of the operating system of the computer device, the computer device having a browser;
the computing machine comprising:
a web server having at least one web application;
a wireless access point for creating a Wi-Fi network;
at least one port connected to a plurality of peripheral devices, the plurality of peripheral devices capable of sending information to one another, and each of the plurality of peripheral devices associated with a function of the web application, and the plurality of peripheral devices being locally accessible to a user;
a processor having an operating system and a device driver for allowing the web application to communicate with the plurality of peripheral devices;
wherein in operation, the user uses the computer device to select and connect to a Wi-Fi network created by the wireless access point, a web page of the web application is loaded wirelessly onto the browser of the computer device and thereafter, the user can use the computer device to select on the web page the function of the web application which then sends instructions to at least one of the plurality of peripheral devices, wherein there is no direct communication between the computer device and the plurality of peripheral devices as all communication between the computer device and the plurality of peripheral devices is via the computing machine.

2. The computing machine of claim 1 wherein the web page of the web application has computer device specific cascading style sheets.

3. The computing machine of claim 1 wherein the computing machine further comprising a housing.

4. The computing machine of claim 1 wherein the peripheral device is integrated mechanically within the housing or is an independent device external to the housing.

5. The computing machine of claim 1 wherein the operating system is Linux.

6. The computing machine of claim 1 wherein the computing machine has internet connecting capabilities.

7. A method for allowing web applications to be run from a Wi-Fi capable computer device independent of the operating system of the computer device, the computer device having a browser;
the method comprising the steps of:
establishing wireless connection between the computer device and a wireless access point of a computing machine; the computing machine further comprising a web server and at least one port, the at least one port connected to a plurality of peripheral devices being locally accessible to a user, the plurality of peripheral devices capable of sending information to one another, and the web server having at least one web application and each of the plurality of peripheral devices associated with a function of the web application;
loading a web page of the web application onto the browser of the computer device via the wireless connection;
using the computer device to select on the web page the function of the web application;
interfacing the web application and the peripheral device with a processor of the computing machine, the processor having an operating system and a device driver;
sending instructions from the web application to at least one of the plurality of peripheral devices, wherein there is no direct communication between the computer device and the plurality of peripheral devices as all communication between the computer device and the plurality of peripheral devices is via the computing machine.

8. The method of claim 7 wherein the step of loading a web page of the web application onto the browser of the computer device via the wireless connection further comprises loading computer device specific cascading style sheets of the web page onto the browser of the computer device.

9. The method of claim 7 further comprising the step of providing an Application Programming Interface and a toolkit to help customers develop their own web applications and integrate new peripheral devices.

10. The method of claim 7 wherein the operating system is Linux.

11. The method of claim 7 wherein the computer device browser is a webkit browser.

12. A method of deploying web applications for use with computer devices in a location comprising the steps of:
installing a computing machine as claimed in claim 1 in the location.

* * * * *